UNITED STATES PATENT OFFICE.

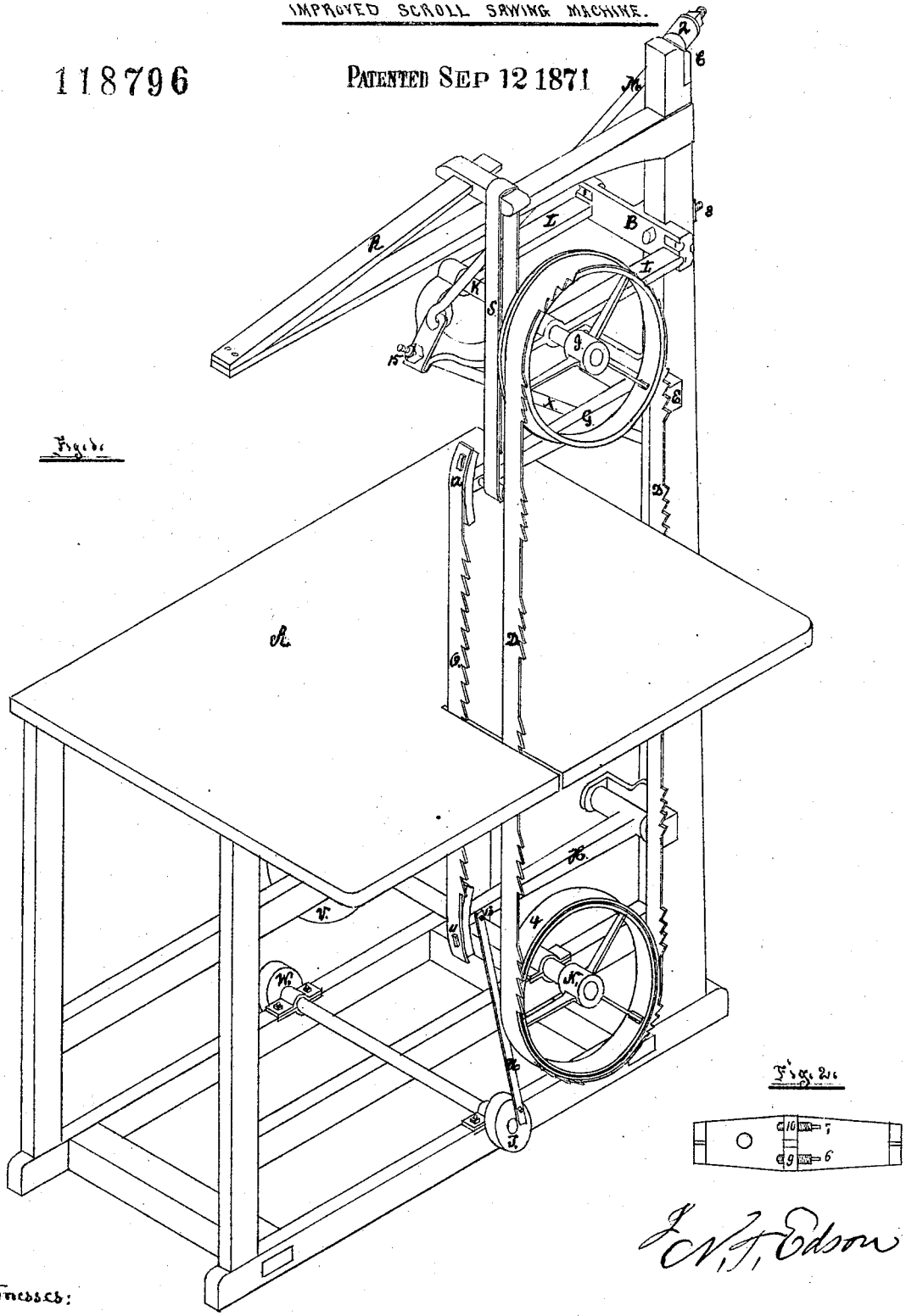

NATHANIEL T. EDSON, OF NEW ORLEANS, LOUISIANA.

IMPROVEMENT IN SCROLL-SAWING MACHINES.

Specification forming part of Letters Patent No. 118,796, dated September 12, 1871.

*To all whom it may concern:*

Be it known that I, NATHANIEL T. EDSON, of the city of New Orleans, parish of Orleans and State of Louisiana, have invented certain new and useful Improvements on Scroll-Sawing Machines; and I do hereby declare that the following is a full, clear, and exact description of the construction and operation of the same, reference being had to the annexed drawings making part of this specification.

The first part of my invention relates to the combination of a hanger which supports the pulley on which a band-saw runs with a plate and rod for giving the saw support and tension, and a rod to protect the hanger in case the saw breaks. The second part of my invention relates to the application of a spring or rubber block in combination with the above hanger, rod, and plate. The third part of my invention relates to the application of set-screws to regulate the adjustment of the hanger, pulley, and saw.

To enable others skilled in the art to make and use my invention, I will proceed to describe its construction and operation.

Table A, Figure 1, is supported by four posts, one of which is larger and much higher than the others, designated the king-post, to which are attached plates B and C for the support, adjustment, and tension of band-saw D, and plates E and F, to which levers G and H are attached by pivot. Pulley I is supported by its shaft K, which revolves in journal-boxes formed in the elastically-suspended hanger L, the rounded ends of which hanger rest in appropriately-formed recesses 1, in plate B, thereby forming a hinge or pivot. The outer end of the hanger is supported by rod M, connected thereto, the upper end of which rod passes through an orifice in plate C and through a block of rubber, 2, resting on the plate; then through a threaded nut, 3, the turning of which gives the desired tension to saw D. The lower pulley N, around which saw D passes, after having been firmly attached to its shaft and placed in its position, and its face being in its rough state as originally cast, is coated with plaster of Paris, and turned, when hard, preparatory to receiving rubber facing 4. The face of pulley I is provided with a flange, 5, against which the back edge of saw D comes when operating, when hanger L is properly adjusted, which adjustment is effected by the set-screws 6 and 7, Fig. 2, and the bolt 8, which passes through plate B and the king-post, the screws 6 and 7 screwing through studs 9 and 10 formed on the back side of plate B, as shown in Fig. 2, and against the king-post. To increase the pressure of saw D against the flange 5, I loose the lower screw 6 and turn the screw 7 against the post. The saw D is driven by a belt over pulley V. X is a rod firmly attached to the king-post at its lower end, with its other end passing through hanger L and receiving a nut, 15, at its end, the object of which rod is to hold the hanger against plate B and to add in giving a proper tension to the band-saw.

To regulate the feed, reduce the labor and facilitate the filing of the band-saw, I form their teeth in clusters of four, or any desired number, with blanks between.

I claim as my invention—

1. Hanger L, in combination with plate B, rod M, and rod X, substantially as and for the purpose hereinbefore set forth.

2. Rubber block 2, in combination with hanger L, rod M, and plate B, substantially as and for the purpose hereinbefore set forth.

3. Set-screws 6 and 7, Fig. 2, in combination with bolt 8, substantially as and for the purposes represented.

N. T. EDSON.

Witnesses:
WM. McC. JONES,
S. C. COCKRILL.